United States Patent
Mosquet et al.

(10) Patent No.: US 8,092,589 B2
(45) Date of Patent: *Jan. 10, 2012

(54) COMPOSITIONS FOR CURING MORTAR OR CONCRETE MIXTURES, ENSURING WATER RETENTION (DURING SETTING), AND METHOD THEREFOR

(75) Inventors: Martin Mosquet, Sermaises (FR); Olivier Malbault, Boutigny sur Essonne (FR); Isabelle Dubois-Brugger, Avon (FR)

(73) Assignee: Chryso S.A.S. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,929

(22) Filed: Jan. 27, 2010

(65) Prior Publication Data
US 2010/0129671 A1     May 27, 2010

Related U.S. Application Data

(63) Continuation of application No. 10/510,247, filed as application No. PCT/FR03/01046 on Apr. 3, 2003, now abandoned.

(30) Foreign Application Priority Data

Apr. 4, 2002 (FR) ..................................... 02 04208

(51) Int. Cl.
*C04B 7/02* (2006.01)
(52) U.S. Cl. ..................................... 106/660; 427/393.6
(58) Field of Classification Search .................. None
See application file for complete search history.

(56) References Cited

U.S. PATENT DOCUMENTS

| | | | |
|---|---|---|---|
| 2,928,752 A | 3/1960 | Felletschin |
| 3,189,469 A | 6/1965 | Littler et al. |
| 3,669,917 A | 6/1972 | Ando et al. |
| 4,207,115 A | 6/1980 | Boehme et al. |
| 4,239,540 A | 12/1980 | Hsin-Chu |
| 4,495,319 A | 1/1985 | Sackis et al. |
| 4,525,495 A | 6/1985 | Dorman et al. |
| 4,563,296 A | 1/1986 | Gomez |
| 4,681,910 A | 7/1987 | Crockatt et al. |
| 4,741,773 A | 5/1988 | Kuroda et al. |
| 4,830,783 A | 5/1989 | Ellis et al. |
| 5,100,697 A | 3/1992 | Nielsen |
| 5,338,345 A | 8/1994 | Scarborough et al. |
| 5,488,021 A | 1/1996 | DeLiso et al. |
| 6,297,413 B1 | 10/2001 | Colson et al. |
| 6,538,438 B1 | 3/2003 | Speier et al. |

FOREIGN PATENT DOCUMENTS

| | | |
|---|---|---|
| DE | 19735431 C1 | 2/1999 |
| FR | 2691962 | 12/1993 |
| GB | 2267841 A | 12/1993 |

OTHER PUBLICATIONS

International Search Report from PCT Application No. PCT/FR03/01046.
ICSC 1380—naptha (petroleum), hydrotreated heavy, Mar. 2001, International Occupational Safety and Health Information.

*Primary Examiner* — Melvin Mayes
*Assistant Examiner* — Stefanie Cohen
(74) *Attorney, Agent, or Firm* — McCarter & English, LLP

(57) ABSTRACT

The invention relates to compositions intended to be applied to surfaces of freshly poured mortar and/or concrete mixes, before the start of setting, in order to prevent the evaporation of water needed for them to set and harden, which are distinguished by the fact that, for the purpose of making them synergistic with regard to water retention, they are composed, in the form of aqueous emulsions, of:
  a) at least one petroleum-derived or synthetic paraffin wax containing, as a mixture, saturated and unsaturated aliphatic hydrocarbons of general formulae $C_nH_{2n+2}$ and $C_nH_{2n}$ for which n is at least equal to 30 and the melting point of which is between 40° C. and 75° C.;
  b) at least one linear and/or cyclic hydrocarbon oil, of aliphatic and/or naphthenic origin, which are hydrocarbon chains, by themselves or as a mixture, of general formula $C_nH_{2n+2}$ and $C_nH_{2n}$ for which n is less than 30, in a liquid state at room temperature; and/or
  c) at least one oil formed from at least one ester resulting from the condensation reaction between a saturated and/or unsaturated fatty acid and a monohydric, dihydric or trihydric alcohol.

14 Claims, No Drawings

COMPOSITIONS FOR CURING MORTAR OR CONCRETE MIXTURES, ENSURING WATER RETENTION (DURING SETTING), AND METHOD THEREFOR

This is a continuation application claiming priority to U.S. application Ser. No. 10/510,247 filed May 2, 2005 now abandoned, which claims priority to International Application No. PCT/FR03/01046 filed on Apr. 3, 2003, which claims priority to French Application No. 02/04208 filed on Apr. 4, 2002, the entire contents of each of which are hereby incorporated by reference.

FIELD OF THE INVENTION

The invention relates to compositions for treating the surfaces of freshly applied mortar and/or concrete mixes, ensuring retention of water needed for them to set and harden.

The invention relates more particularly to curing compositions for freshly applied mortar and/or concrete mixes in order to prevent the evaporation of some of the water involved in their preparation, this water being needed for them to set and harden, which compositions comprise, in aqueous emulsion, at least one paraffin wax and at least one ester-based oil and/or at least one oil based on branched or unbranched, linear and/or cyclic hydrocarbon chains resulting from the distillation of crude oil, these various compounds acting in complete synergy.

The invention also relates to the method of preparing said compositions and of applying them to the surface of freshly poured mortar and/or concrete mixes.

Finally, the invention relates to the use of said compositions in the form of a layer, deposited on the surface of freshly poured mortar and/or concrete mixes, applied in order to ensure water retention within the mortar and/or concrete mixes when they set and harden, and to maintain within them a sufficient amount of water for the purpose of preventing, or at the least limiting, shrinkage effects with the appearance of cracks, and to maintain, in these mortar and/or concrete mixes, the desired characteristics such as, for example, a very low shrinkage, good water impermeability, excellent frost resistance and other properties.

PRIOR ART

The incorporation of water into a medium containing a hydraulic binder among its constituents, such as mortar and/or concrete mixes, causes irreversible reactions involving the formation of needle-like crystals by hydration of the initially amorphous and anhydrous mineral salts present, and results in the setting of the hydraulic binder by interpenetration of these incorporated into the binder, or into the medium containing it, evaporates and that consequently there is a lack of water for continuing the crystallization during the maidening step over the course of which the hydraulic binder, or the medium containing it, acquires all the desired mechanical properties, such as, for example, a low amount of shrinkage, water impermeability, low-temperature resistance and high mechanical strength.

For a long time one of the most common defects has been the appearance of cracks during curing, these being due to the shrinkage of the mortar or concrete containing a hydraulic binder, this shrinkage very often being the consequence of a loss of water by evaporation when the medium containing the hydraulic binder, particularly mortar and concrete mixes, is subjected to the simultaneous action of the exothermicity developed by the setting reaction, its exposure to sunshine and to the presence of natural drying ventilation.

Various means have been used to make up for, or prevent, evaporative loss of some of the water incorporated into media containing, among their constituents, a hydraulic binder such as, in particular, mortar and concrete mixes.

According to a first type of means, a conventional and long-established treatment for preventing water evaporation consists in keeping the surface of freshly poured mortar and/or concrete mixes in contact with the most permanently humid environment possible during the setting time, by the creation of a sustained film of water or by the use of a textile substrate of spongy character, imbibed with water, or else by the use of a polymer film unwound over said surface in order to prevent evaporation, by creating a greenhouse environment between the surface to be protected and the atmosphere.

However, this first type of means is not very practical nowadays on building sites or sites involving substantial renovation, as diligent surveillance and consequently mobilization of the workforce are required.

According to another type of means, a continuous adherent and protective film is created on the surface of the mortar and/or concrete mixes by depositing thereon, by spraying or by brushing, a paraffin wax by itself or combined with at least one hydrocarbon resin dissolved in an organic solvent in order to form a barrier between said surface and the ambient atmosphere and thus prevent evaporation of the water present in the composition of the mortar and/or concrete mixes from occurring.

However, this type of means has several drawbacks, which may make its use unacceptable. Among the most important drawbacks, the use of organic solvents constitutes an environmental hazard, most particularly when solvents are used that are carcinogenic, such as benzene, toluene and other aromatic solvents, or else halogenated solvents such as chlorinated hydrocarbons (trichloroethylene and perchloroethylene). Other major drawbacks are also perceptible, such as, for example:

incompatibility between organic solvents and water, which means having to wait, in order to create the protective film on the surface to be protected, for the moisture of this surface to be as low as possible, said film being created once the setting of the mortar and/or concrete mixes has already been well initiated. As a consequence, the film is created belatedly and is often inoperative since the water evaporation, which has to be prevented, has already started, or is even well advanced;

poorly controlled, incomplete and irregular degradation of the film created in order to form a barrier to evaporation, by the action of ultraviolet radiation that leaves residues of the protective film adhering to the treated surface; and reduction in the adhesion to the surfaces thus treated, of the finishing materials such as plaster coatings, paints, adhesives for ceramics and the like, when the film created in order to form an evaporation barrier is partially degraded at the moment when the finishing work starts.

Finally, according to another type of means, a continuous protective film is created on the surface of the freshly poured mortar and/or concrete mixes via depositing thereon, by spraying or brushing, an emulsion in water of a paraffin wax by itself or one combined with at least one other compound such as a hydrocarbon resin, a hydrocarbon oil and/or a pigmentary filler and/or fatty alcohols and/or fatty acids, in order to form, prior to the start of setting, a barrier between said surface and the ambient atmosphere and thus prevent the evaporation of water involved in the composition of the mortar and/or concrete mixes from occurring. This emulsion has, in common with the mortar and concrete mixes, the presence of water that makes this type of anti-evaporation treatment compatible and particularly beneficial.

Falling within this latter type of means are many documents that describe water emulsion compositions intended for the surface treatment of the freshly applied mortar and/or concrete mixes, the function of which is to prevent evaporation of water involved in the formation of said mortar and concrete mixes.

A first document (U.S. Pat. No. 2,928,752) discloses aqueous emulsions intended for the protection of mortar and/or concrete surfaces during the setting period, and then at the start of the hardening period, in order to prevent water evaporation, these emulsions comprising a paraffin wax, a product resulting from the reaction of ethylene oxide with an unsaturated oleic alcohol, an amine salt of a $C_{12}$ to $C_{18}$ long-chain carboxylic acid, a $C_{12}$ to $C_{20}$ long-chain fatty alcohol and, optionally, a small amount (0 to 10% by weight) of a mineral oil intimately mixed, when it is present, with the molten wax in order to make this wax more malleable.

These compositions, the essential drawback of which is their complexity owing to the number of components from which they are formed, are deemed to adhere better to the surfaces of the mortar and/or concrete mixes to be protected from the evaporation of water thanks to the presence of the amine functional group which has an affinity for components of the mortar and/or concrete mixes.

However, these coating compositions for protecting the surfaces of mortar and/or concrete mixes, in order to prevent the evaporation of water, have drawbacks, these being, apart from the complexity of their formulations, for example:
  deactivation of the mortar and/or concrete by the presence of the alcohol or acid functional groups, this drawback being well known to those skilled in the art and manifested by chemical attack of the surface to be protected, with disappearance of the hydraulic binder on or around the aggregate present, and creation of an irregular surface finish after setting and curing;
  introduction of a setting delay on the surface of the treated mortar and/or concrete, owing to the presence of the alcohol functional group and, consequently, a delay in the evaporation;
  lack of adhesion of the finishing materials applied to the surfaces treated by means of said compositions; and
  water retention that is often insufficient in surface-treated mortar and/or concrete mixes, resulting in cracking phenomena.

Another document (U.S. Pat. No. 3,189,469) discloses aqueous emulsions with a reflective capacity when they are applied to the surfaces of freshly poured mortar and/or concrete mixes, to be protected from water evaporation during the setting period and the start of curing, which are composed, in combination, of a hydrocarbon wax, which is essentially a paraffin wax, in an amount from 15 to 50% by weight, of a product resulting from the reaction between $C_{12}$ to $C_{22}$ saturated and unsaturated fatty acids and an alkaline agent, such as an alkali metal hydroxide, or an amine in an amount from 1 to 10% by weight of said product, of a mineral pigment with a high reflecting power, such as $TiO_2$, in an amount from 1 to 10% by weight, and a nonionic and anionic dispersing agent in an amount from 1 to 3% by weight.

These compositions are regarded as being more adherent to the surfaces of mortar and/or concrete mixes to be protected from the evaporation of water, thanks to the presence of the amine functional group or of the alkaline compound that neutralizes the acid function of the saturated and unsaturated fatty acids, this amine functional group and the alkaline compound having the advantage of exhibiting affinity for the components of the mortar and/or concrete mixes.

Despite this advantage, these coating compositions for protecting the surfaces of mortar and/or concrete mixes in order to prevent the evaporation of water, while they are setting and curing, have drawbacks, these being, for example:
  the complexity of their formulation;
  the deactivation of the mortar and/or concrete by the presence of the acid functional group provided by the fatty acids, which results in the hydraulic binder being attacked on the surface, exposing the mineral fillers;
  the introduction of a delay in the setting on the surface of the treated mortar and/or concrete mixes and, consequently a shift in the evaporation of the surface water;
  the lack of adhesion of finishing material applied to the treated surfaces;
  the presence of a pigment such as $TiO_2$ for providing said compositions with a high reflectivity capable of helping to reduce evaporation of water on the surface of the mortar and/or concrete mixes during setting and hardening; and
  water retention deemed to be insufficient.

Another document (U.S. Pat. No. 4,239,540) describes an aqueous emulsion for protecting the surfaces of freshly poured mortar and/or concrete mixes, in order to prevent the evaporation of water during the setting period and then the hardening period, which is composed of a paraffin wax (18.2% by weight), a mixture of oils formed from a coconut oil (4.2% by weight), a soybean oil (3.3% by weight), a linseed oil (4.2% by weight), stearic acids (3.4% by weight), hexacosanoic acid (1.6% by weight), water (62.5% by weight) and an ethyl/cyanuric acid ester (2.6% by weight) as emulsifier.

This aqueous emulsion of very particular and very narrow composition, which might appear beneficial for treatment for preventing the evaporation of water from the surfaces of mortar and/or concrete mixes during setting and curing, is in fact not able to be exploited as the results indicated show that it has a very low water retention capability (0.027 to 0.038 g of water/$cm^2$). Furthermore, this aqueous emulsion contains organic acids whose acid functional group:
  has the property of deactivating the mortar and/or concrete surfaces on which said emulsion is deposited; and
  also causes a delay in surface setting of said treated mortar and/or concrete mixes.

Another document (U.S. Pat. No. 4,495,319) discloses a method of preparing an emulsion intended for the curing treatment of the surfaces of freshly poured mortar and/or concrete mixes in order to prevent the evaporation of water present on the surface of said mortar and/or concrete mixes during the setting period and the hardening period. This emulsion is formed from a hydrocarbon resin, a paraffin wax, and emulsifiers obtained from fatty acids and morpholine. The presence of pigments, such as $TiO_2$, and/or of a mineral filler, such as $CaCO_3$, is also disclosed.

However, this emulsion has the drawback of being composed of materials that are solid at room temperature, that is to say hydrocarbon resins and waxes in the solid state, making it difficult to prepare the emulsion and resulting in an emulsion that may be unstable and whose use, as protective film against the evaporation of water from the surface of freshly poured mortar and/or concrete mixes, is rather disappointing—the ability of this emulsion to prevent water loss by evaporation appears to be insufficient even when this emulsion contains a pigment for increasing the reflectance thereof and, consequently, for trying to increase its efficiency.

Another document (FR 2 691 962) discloses aqueous emulsions of a paraffin wax and natural or synthetic hydrocarbon resins, particularly pine resins, which emulsions are intended to be applied to the surfaces of freshly poured mortar and/or concrete mixes in order to limit the evaporation of water during the setting period and the start of hardening.

However, these emulsions are composed of materials that are solid at room temperature, making them difficult to prepare, making their stability for a time uncertain and making their use as protective film against the evaporation of water from the surface of mortar and/or concrete mixes unsatisfactory as regards the stated results (52.8% after two hours— much less than the 85% from the paraffin wax alone).

SUBJECTS OF THE INVENTION

As the prior art reveals, the aqueous emulsions proposed and intended to be applied to surfaces of freshly poured mortar and/or concrete mixes in order to limit the evaporation of water right from the start of setting have many drawbacks.

This is the reason why the subjects of the invention are numerous and multifarious, as are the aforementioned drawbacks, in order to provide at least one improvement thereto.

The various subjects assigned to the invention appear to be the creation of organic compositions that are aqueous emulsions provided with necessary and desirable essential characteristics so that they are applied to surfaces of freshly poured mortar and/or concrete mixes and, once applied, they limit, and preferably prevent, evaporation of the water needed absolutely for them to set and harden.

Among the essential features assigned to the aqueous emulsions according to the invention, certain of them are mentioned by way of illustration. Thus, the aqueous emulsions according to the invention:
  must be formed, apart from the paraffin wax normally present, from hydrocarbon compounds that are liquid at room temperature;
  cannot include compounds liable to deactivate the mortar and/or concrete mixes that receive them;
  must be free of compounds liable to retard, at the surface, the setting of the mortar and/or concrete mixes that are covered thereby;
  must be easy to prepare and be stable after their preparation;
  must be easy to apply preferably by spraying, onto the surfaces to be treated;
  must be applied very rapidly to the surfaces of freshly poured mortar and/or concrete mixes before they start to set;
  must be able to provide said treated surfaces with greater protection against the evaporation of water than that provided by the paraffin wax alone;
  must not contain compounds that are particularly harmful to the environment;
  must be free of carcinogenic compounds such as, in particular, benzene, toluene and xylene; and
  must allow, after their degradation, good adhesion to the finishing materials applied to the treated surfaces.

BRIEF DESCRIPTION OF THE INVENTION

According to the invention, the aqueous emulsions intended to be applied to surfaces of freshly poured mortar and/or concrete mixes, in order to prevent the evaporation of water right from the start of setting, at least partly eliminate the drawbacks manifested in the prior art and also provide substantial improvements not existing in the means described hitherto for making the emulsions particularly effective in the role assigned to them.

According to the invention, the compositions intended to be applied to surfaces of freshly poured mortar and/or concrete mixes, before the start of setting, in order to prevent the evaporation of water needed for them to set and harden, are distinguished by the fact that, for the purpose of making them synergistic with regard to water retention, they are composed, in the form of aqueous emulsions, of:
  a) at least one petroleum-derived or synthetic paraffin wax containing, as a mixture, saturated and unsaturated aliphatic hydrocarbons of general formulae $C_nH_{2n+2}$ and $C_nH_{2n}$ for which n is at least equal to 30 and the melting point of which is between 40° C. and 75° C.;
  b) at least one linear and/or cyclic hydrocarbon oil, of aliphatic and/or naphthenic origin, which are hydrocarbon chains, by themselves or as a mixture, of general formulae $C_nH_{2n+2}$ and $C_nH_{2n}$ for which n is less than 30, in a liquid state at room temperature; and/or
  c) at least one oil formed from at least one ester resulting from the condensation reaction between a saturated and/or unsaturated fatty acid and a monohydric, dihydric or trihydric alcohol.

DETAILED DESCRIPTION OF THE INVENTION

The compositions according to the invention, intended to be applied to surfaces of freshly poured mortar and/or concrete mixes before the start of setting, in order to prevent the evaporation of the water needed for them to set:
  are aqueous paraffin wax and oil emulsions;
  are synergistic with regard to water retention through their components and the relative amounts of these various components involved; and
  are storage stable, even for long periods.

According to the invention, the compositions intended, by their presence, to prevent the evaporation of water from freshly poured mortar and/or concrete mixes, are aqueous paraffin wax emulsions. As a matter of fact, an emulsion is, by definition, a dispersion of a liquid compound, or one that is made liquid, in another liquid compound. In the case of the invention, the paraffinic compound, called component (a), which at room temperature is a water-immiscible solid compound, is made liquid by a slight rise in temperature and simultaneously dispersed in the water heated to a suitable temperature in order to form by vigorous stirring, an emulsion. However, the paraffinic compound may already be in the form of an aqueous emulsion sold and be used in this state for the preparation of the compositions according to the invention.

The paraffin wax, used within the context of the invention for producing the aforementioned emulsion, is chosen from the group consisting of alkanes and/or alkenes, by themselves or as a mixture, which are petroleum-derived or synthetic saturated and/or unsaturated hydrocarbons of general formulae $C_nH_{2n+2}$ and $C_nH_{2n}$ for which n is at least equal to 30 and preferably lies between $30 \leq n \leq 120$ and the melting point of which is between 40° C. and 75° C. and preferably between 50° C. and 70° C.

Depending on the value of "n" and the relative amounts of alkanes and alkenes forming the paraffin wax employed, the density of said paraffin wax is between 0.85 and 0.95 and preferably between 0.88 and 0.92.

To prevent the emulsion produced by dispersing the molten paraffin wax in water from undergoing a coalescent effect, that is to say one in which the paraffin wax and the water separate into two layers, an emulsifier for promoting stability of the emulsion may be introduced into said emulsion, this emulsifier being capillarily active and, as a result of an adsorption phenomenon, coating the surfaces that separate the paraffin wax microdroplets from the water, enveloping them with an interfacial film.

Such an emulsifier may be of the anionic and/or nonionic kind. It may be chosen from well-known emulsifying products such as $C_8$ to $C_{22}$ fatty acids neutralized by an amine, in particular by triethanolamine; sulfonated and phosphonated compounds; fatty alcohols; sorbitan esters; ethylene oxide/propylene oxide copolymers, etc. Such emulsifiers are sold, for example, by SEPPIC under the names SIMULSOL, MONTANE, and MONTANOX and by Lambert-Riviére under the name SYNTOPON.

Wax-in-water emulsions, the wax of which meets the aforementioned characteristics, are sold, for example, by Exxon-Mobil Oil under the brand names MOBILCER 115, MOBILCER 730, MOBILCER C, PROWAX 397 and MOBILWAX 2370 or by Suddeutsche Emulsions Chemie under the brand names WUKONIL KN 50, WUKONIL LP 50 and WUKONIL LP 38 or by Michelman under the brand name ME91240E.

The compositions according to the invention also contain at least one petroleum-derived hydrocarbon oil called component (b), of aliphatic and/or naphthenic type and, in the latter case, obtained from the series of cyclopentanes and cyclohexanes, which are hydrocarbons, present by themselves or as mixtures, which are saturated and/or unsaturated and of general formulae $C_nH_{2n+2}$ and/or $C_nH_{2n}$ for which n is less than 30 and preferably between 10 and 25, these hydrocarbon oils being in a liquid state at room temperature.

All these oils have, under normal temperature and pressure conditions, a kinematic viscosity of between 5 and 500 mm$^2$/s and a density of between 0.83 and 0.97.

As aliphatic and/or naphthenic hydrocarbon oil, mention may be made, by way of example, of the oil NEUTRAL sold by Exxon-Mobil, which has a kinematic viscosity of 20 mm$^2$/s, or the oils HMVIP 30 and HVI 65 sold by Shell and the oils 60 NEUTRAL, 80 NEUTRAL and 150 NEUTRAL sold by Exxon-Mobil.

The compositions according to the invention also contain, combined with or as a replacement for component (b), at least one oil that is liquid at room temperature and formed by an ester resulting from the condensation reaction between a saturated and/or unsaturated fatty acid and a monohydric, dihydric or trihydric alcohol, constituting component (c).

The fatty acids used to form the ester according to the invention are branched or unbranched, saturated and/or unsaturated hydrocarbon compounds coming from the hydrogenation of oils and fats, preferably carrying a single carboxylic acid functional group. They are generally chosen, for example, from the group consisting of $C_8$ to $C_{24}$ fatty acids, such as for example caprylic, capric, lauric, myristic, palmitic, stearic, arachidic, behenic, lignoceric, palmitoleic, oleic, gadaleic, erucic, linoleic, linolenic and isolinolenic acids.

The alcohols used to form the ester according to the invention are hydrocarbon compounds comprising one, two or three $C_2$ to $C_{20}$ alcohol functional groups. These alcohols may be chosen from the group consisting of alkanols and/or alkenols, such as for example ethanol, propanol, butanol, pentanol, stearic alcohol and oleic alcohol, when a monohydric alcohol is to be used, from the group consisting for example of propanediol, butanediol, pentanediol, hexanediol, heptanediol, octanediol, nonanediol, decanediol, undecanediol and dodecanediol and other dihydroxyalkanes and alkenes, when a dihydric alcohol is to be used and/or from the group consisting of glycerol, butanetriol, pentanetriol, hexanetriol, heptanetriol, octanetriol, nonanetriol, decanetriol, undecanetriol and dodecanetriol and other trihydroxyalkanes or alkenes when a trihydric alcohol is to be used.

The compositions according to the invention, produced by means of components (a), (b) or (c), these being:
petroleum-derived or synthetic paraffin waxes containing, as a mixture, saturated and/or unsaturated hydrocarbons of general formula $C_nH_{2n+2}$ and/or $C_nH_{2n}$ with $n \geq 30$;
at least one aliphatic and/or naphthenic, linear and/or cyclic hydrocarbon oil of general formula $C_nH_{2n+2}$ and $C_nH_{2n}$ with $n \leq 30$ in a liquid state at room temperature; and/or
at least one oil formed from an ester resulting from the condensation reaction between a saturated and/or unsaturated fatty acid and a monohydric, dihydric or trihydric alcohol;
are synergistic compositions intended to be applied to surfaces of freshly poured mortar and/or concrete mixes, before the start of setting, in order to prevent the evaporation necessary for them to set and harden, the synergistic character of which is asserted through their ability to prevent the evaporation of water infinitely better than paraffin wax emulsions by themselves or oils by themselves.

This synergistic character is achieved whenever the various components of these aqueous compositions or emulsions are present, in percentage amounts of active materials (or dry matter) of:
component (a) or paraffin wax: from 2% to 90% by weight, preferably from 5% to 60% by weight and very preferably from 5% to 40% by weight;
component (b) or hydrocarbon oil: from 5% to 90% by weight, preferably from 8% to 40% by weight and very preferably from 9% to 30% by weight;
component (c) or oil formed from at least one ester: from 5% to 90% by weight, preferably from 10% to 50% by weight and very preferably from 15% to 40% by weight; and
water: Q.S. ("sufficient quantity") to 100% by weight.

In addition, the weight ratio of dry active matter of the sum of the oils and of the paraffin wax that are present in the aqueous emulsions of the compositions according to the invention must be at least equal to 0.25, may preferably be at least equal to 0.63 and very preferably may vary between 0.64 and 9.

The compositions according to the invention, in the form of aqueous emulsions, have a dry matter content that may vary, in general, from 10% to 60% by weight but preferably from 30% to 50% by weight.

Said compositions in the form of aqueous emulsions are used by spraying them onto the surfaces to be protected, the useful weight deposited per unit area being between 50 g/m$^2$ and 150 g/m$^2$ in order to achieve total protection, that is to say no evaporation from said surfaces.

The compositions according to the invention, which are aqueous emulsions, are storage stable, even for prolonged periods.

In addition, when these compositions according to the invention are applied, they prove to be very effective since, as opposed to the compositions of the prior art, they require an infinitely smaller amount of active dry matter deposited per m$^2$ of area to be protected, thus making them both very effective and very inexpensive.

The invention also relates to a method of preparing the compositions for protecting surfaces of freshly poured mortar and/or concrete mixes from water evaporation, which comprises the successive steps of introducing the various components into a preparation region subjected to very vigorous stirring, the contents of which may be heated and/or cooled, these steps being:

i) the introduction, in the calculated amount, of water, needed to create the emulsion, optionally followed by the introduction of an emulsifier into said region, this first mixing being carried out with vigorous stirring for the time needed to obtain a homogeneous medium;

ii) the introduction, in the calculated amounts, of the mixture of the oils of component (b) and/or (c), forming a second mixture, which is subjected to the same vigorous stirring for the time needed to obtain the first "oil-in-water" emulsion;

iii) the introduction, in the calculated amount and with gentle stirring, of the paraffin wax into the second mixture:
  preheated to a temperature sufficient to cause the wax to melt and to pass into the emulsion state when said wax is introduced in the form of a very fine powder and
  at room temperature when the wax is introduced in the form of an aqueous emulsion; and
with the gentle stirring maintained for the prolonged time needed to form the emulsion, possibly with cooling of the emulsion; and then iv) subjection of the emulsion resulting from the second mixture converted into an aqueous emulsion to gentle stirring for a prolonged time in order to homogenize the aqueous emulsion containing all the components that has been formed.

The latter gentle stirring time of step iv) may be up to 90 minutes, or even longer.

Example 1

Compositions according to the invention were prepared, in the form of an aqueous emulsion, these being formed from:
  paraffin wax: MOBILCER 115 (registered trademark) sold by Mobil in the form of an aqueous emulsion with a 45% solids content by weight;
  oil of type (c), which was a triglyceride fatty acid ester resulting from the esterification of a mixture of acids (Tungoil) which are eleostearic acid ($C_{18}$ acid with three unsaturated groups) in an amount of 80% by weight, palmitic ($C_{16}$) acid in an amount of 1% and linoleic, linolenic and oleic ($C_{18}$) acids in an amount of 19%, by glycerol; and
  water: Q.S. to 100% by weight.

The method of preparation was as below.

Firstly, the amount of water needed to produce the composition according to the invention, by the formation of an aqueous emulsion, was introduced into a suitable reactor.

When the wax had the appearance of an aqueous emulsion, the amount of water initially introduced took account of the amount of water contained in the aqueous wax emulsion.

If required, an emulsifier (surfactant) was introduced into the initial volume of water, for example MONTANOX 85 (registered trademark) sold by SEPPIC.

The water initially introduced was subjected, whether or not it contained a dispersing agent, to vigorous stirring by a ULTRA-TURRAX® stirrer rotating at 20,000 rpm.

The oil of type (c) was introduced into the aqueous volume, with this vigorous stirring, forming a mixture which was vigorously stirred for five minutes, in order to form the "oil-in-water" emulsion.

At the end of these five minutes of vigorous stirring, said stirring was lessened, the rotation speed of the ULTRA-TURRAX® being reduced to 5,000 rpm. The aqueous wax emulsion was introduced, with this gentle stirring, into the oil-in-water emulsion.

When the introduction of the aqueous wax emulsion was complete, the emulsion mixture formed was subjected, for more than 90 minutes, to gentle stirring, the rotation speed of the ULTRA-TURRAX® being maintained at 5,000 rpm.

At the end of this final stirring time, the composition according to the invention was ready to be applied by spraying, in an amount of 60 g/m² having a 50% solids content by weight.

Eight formulations (1 to 8) of compositions according to the invention were produced, the percentages by weight of the components of which are given in Table I below.

TABLE I

| Formulation No. | Total Water in the Emulsion (wt %) | Wax Solids Content (wt %) | Ester-based Oil (wt %) | Total Solids Content (wt %) |
|---|---|---|---|---|
| 1 | 50.87 | 39.13 | 10.00 | 49.13 |
| 2 | 50.76 | 34.24 | 15.00 | 49.24 |
| 3 | 50.65 | 29.35 | 20.00 | 49.35 |
| 4 | 50.51 | 24.46 | 25.03 | 49.49 |
| 5 | 50.43 | 19.57 | 30.00 | 49.57 |
| 6 | 50.22 | 14.54 | 35.00 | 49.54 |
| 7 | 49.71 | 9.99 | 40.30 | 50.29 |
| 8 | 49.90 | 4.99 | 45.10 | 50.09 |

In the above Table I, the percentage by weight of water present in the composition according to the invention is the sum of the water present in the MOBILCER 115 emulsion (having a solids content of 45 wt %) and of the water introduced as make-up, the percentage by weight of wax thus being expressed as the % solids content by weight, and likewise the % by weight of the ester-based oil employed.

By way of comparison, four composition formulations in aqueous emulsion form were prepared, two of them (9 and 10) containing the same oil emulsified in water as that used in the eight formulations of the invention, the other two (11 and 12) containing the same wax emulsified in water as that employed in the eight formulations of the invention.

The formulations of each of these comparative compositions are given in Table II below.

TABLE II

| Formulation No. | Total Water in the Emulsion (wt %) | Emulsifier (wt %) | Wax Solids Content (wt %) | Ester-based Oil (wt %) | Total Solids Content (wt %) |
|---|---|---|---|---|---|
| Control 9 | 62 | 3 | 0 | 35 | 38 |
| Control 10 | 48 | 3 | 0 | 49 | 52 |
| Control 11 | 55 | 0 | 45 | 0 | 45 |
| Control 12 | 82.15 | 0 | 14.85 | 0 | 14.85 |

Trials were carried out on said compositions in the form of a sprayed layer in the case of each of them, this being deposited on the surface of the freshly poured mortar and/or concrete mixes, for the purpose of retaining water within said mortar and/or concrete mixes until they set, and then harden.

These surface protection trials were carried out for equivalent dosage, this dosage being 60 g/m² of the emulsion with a 50% solids content.

The results of this water retention are given in Table II below in the form of a protection factor at 6 hours and 24 hours after pouring the concrete, which indicates the percentage by weight of water retained on the treated surfaces.

TABLE III

| Formulation No. | Protection Factor | |
|---|---|---|
| | At 6 hours | At 24 hours |
| 1 | 67.9 | 63.2 |
| 2 | 80.6 | 75.3 |
| 3 | 79.4 | 73.5 |
| 4 | 85.9 | 73.6 |
| 5 | 89.6 | 78.2 |
| 6 | 88.9 | 80.5 |
| 7 | 79.3 | 76.5 |
| 8 | 72.0 | 70.3 |
| Control 9 | 58.3 | 45.3 |
| Control 10 | 80.9 | 66.2 |
| Control 11 | 18.8 | 12.3 |
| Control 12 | 13.5 | 8.4 |

These three tables show the following:

there is good synergy in the compositions according to the invention since comparison of trials 1 to 8 with control trials 9 and 10 in the case of the oil and 11 and 12 in the case of the wax shows that the simultaneous presence of the oil and the wax in the aqueous emulsion composition leads to results in terms of protection that are greatly superior to the results of the controls;

a maximization phenomenon occurs in the protection of the treated surfaces when the ratio of the percentage oil by weight to the percentage wax solids content by weight in the compositions according to the invention is very preferably between 0.64 and 9; and the protection of the treated surfaces is achieved with a low active dry matter content of the compositions according to the invention compared with the control compositions.

Example 2

Compositions according to the invention were prepared, in the form of an aqueous emulsion, these being formed from:

paraffin wax: MOBILCER 115 (registered trademark) sold by Mobil in the form of an aqueous emulsion with a 45% solids content by weight;

oil of type (b), which is a paraffinic oil, of low viscosity equal to 20 mm²/s, sold by Mobil under the brand name 60 NEUTRAL;

water: Q.S. to 100% by weight.

The method of preparing the compositions according to the invention was the same as that described in Example 1.

Seven formulations were produced, the percentages by weight of the components of which are given in Table IV below.

TABLE IV

| Formulation No. | Total Water in the Emulsion (wt %) | Emulsifier (wt %) | Wax Solids Content (wt %) | Paraffin Waxic Oil of type b) (wt %) | Total Solids Content (wt %) |
|---|---|---|---|---|---|
| 13 | 69.57 | 0.95 | 23.47 | 6.00 | 30.43 |
| 14 | 69.12 | 1.34 | 20.54 | 9.00 | 30.88 |
| 15 | 68.60 | 1.79 | 17.61 | 12.00 | 31.40 |
| 16 | 68.77 | 2.14 | 14.26 | 14.53 | 30.94 |
| 17 | 68.71 | 2.60 | 11.27 | 17.42 | 31.29 |
| 18 | 68.33 | 3.10 | 8.40 | 20.17 | 31.67 |
| 19 | 68.02 | 3.50 | 5.57 | 22.91 | 31.98 |

In the above Table IV, the percentage by weight of water present in the composition according to the invention is the sum of the water present in the MOBILCER 115 emulsion (having a solids content of wt %), the percentage by weight of wax thus being expressed as the % solids content by weight, and likewise the % by weight of the paraffinic oil employed.

In addition, compositions 13 to 19 according to the invention contained an emulsifier, which was a nonionic sorbitan ester emulsifier, possessing 85 ethylene oxide units, sold by SEPPIC under the brand name MONTANOX 85.

By way of comparison, four composition formulations in aqueous emulsion form were prepared, two of them (20 and 21) containing the same oil emulsified in water as that used in the seven formulations of the invention, the other two (22 and 23) containing the same wax emulsified in water as that employed in the seven formulations of the invention.

The formulations of each of these comparative compositions are given in Table V below.

TABLE V

| Formulation No. | Total Water in the Emulsion (wt %) | Emulsifier (wt %) | Wax Solids Content (wt %) | Paraffin Waxic Oil (wt %) | Total Solids Content (wt %) |
|---|---|---|---|---|---|
| 20 | 77 | 3 | 0 | 20 | 23 |
| 21 | 48 | 3 | 0 | 49 | 52 |
| 22 | 55 | 0 | 45 | 0 | 45 |
| 23 | 85.15 | 0 | 14.85 | 0 | 14.85 |

Trials were carried out on said compositions in the form of a sprayed layer in the case of each of them, this being deposited on the surface of the freshly poured mortar and/or concrete mixes, for the purpose of retaining water within said mortar and/or concrete mixes until they set, and then harden.

These surface protection trials were carried out for equivalent dosage, this dosage being 60 g/m² of the emulsion with a 30% solids content in one case and 150 g/m² of the 30% emulsion in the other case.

The results of this water retention are given in Tables VI and VII below in the form of a protection factor at 6 hours and 24 hours after pouring the concrete, which indicates the percentage by weight of water retained on the treated surfaces.

TABLE VI

Surface protection trials carried out with a dosage equivalent to 60 g/m² of the emulsion with a 30% solids content

| | Protection Factor | |
|---|---|---|
| Formulation No. | At 6 hours | At 24 hours |
| 13 | 78.6 | 76.9 |
| 14 | 79.5 | 77.4 |
| 15 | 82.6 | 80.3 |
| 16 | 83.5 | 80.6 |
| 17 | 83.4 | 81.2 |
| 18 | 82.5 | 78.7 |
| 19 | 79.0 | 76.6 |

TABLE VII

Surface protection trials carried out with a dosage equivalent to 150 g/m² of the emulsion with a 30% solids content

| | Protection Factor | |
|---|---|---|
| Formulation No. | At 6 hours | At 24 hours |
| 13 | 94.3 | 92.3 |
| 14 | 95.4 | 92.9 |
| 15 | 99.1 | 96.4 |
| 16 | 100 | 96.7 |
| 17 | 100 | 97.5 |
| 18 | 99.0 | 94.4 |
| 19 | 94.9 | 91.9 |
| Control 20 | 32.6 | 25.2 |
| Control 21 | 77.1 | 64.8 |
| Control 22 | 26.0 | 17.1 |
| Control 23 | 13.5 | 8.4 |

These three tables show the following:
there is good synergy in the compositions according to the invention since comparison of trials 13 to 19 with control trials 20 and 21 in the case of the oil and 22 and 23 in the case of the wax shows that the simultaneous presence of the oil and the wax in the aqueous emulsion composition leads to results in terms of protection that are greatly superior to the results of the controls;

a maximization phenomenon occurs in the protection of the treated surfaces when the ratio of the percentage oil by weight to the percentage wax solids content by weight in the compositions according to the invention is very preferably between 0.64 and 9; and the protection of the treated surfaces is achieved with a low active dry matter content of the compositions according to the invention compared with the control compositions.

The invention claimed is:

1. A method of preventing the evaporation of water from freshly poured mortar or concrete mixes comprising the steps of:
   (a) providing an aqueous emulsion wherein the dispersed phase of the emulsion comprises
   i) at least one petroleum-derived or synthetic paraffin wax containing saturated aliphatic hydrocarbons, unsaturated aliphatic hydrocarbons or mixtures therof, wherein the aliphatic hydrocarbons are of general formulae $C_nH_{2n+2}$ and $C_nH_{2n}$ for which n is at least equal to 30 and the melting point of which is between 40° C. and 75° C., in combination with
   ii) at least one linear or cyclic hydrocarbon oil, of aliphatic or naphthenic origin, of general formulae $C_nH_{2n+2}$ and $C_nH_{2n}$ for which n is less than 30, which is a liquid at room temperature; or
   iii) at least one oil formed from at least one ester resulting from the condensation reaction between a saturated and/or unsaturated fatty acid and a monohydric, dihydric or trihydric alcohol; or
   iv) a combination of (ii) and (iii); and
   (b) applying the aqueous emulsion to the surface of freshly poured mortar or concrete before the start of setting.

2. The method of claim 1, wherein the paraffin wax is chosen from the group consisting of alkanes, alkenes, or mixtures thereof, which are petroleum-derived or synthetic saturated of general formulae $C_nH_{2n+2}$ and $C_nH_{2n}$ in which n is between $30 \leq n \leq 120$.

3. The method of claim 2, wherein the paraffin wax has a melting point between 50° C. and 70° C.

4. The method of claim 3, wherein the paraffin wax has a density of between 0.85 and 0.95.

5. The method of claim 1, wherein the hydrocarbon oil is of general formulae $C_nH_{2n+2}$ and $C_nH_{2n}$ in which n is between 10 and 25.

6. The method of claim 5, wherein the hydrocarbon oil is chosen from those having a kinematic viscosity of between 5 and 500 mm²/s.

7. The method of claim 6, wherein the hydrocarbon oil is chosen from those having a density of between 0.83 and 0.97.

8. The method of claim 1, wherein the fatty acids used in the preparation of the oil formed from at least one ester are chosen from the group of $C_8$ to $C_{24}$ fatty acids.

9. The method of claim 8, wherein the fatty acids are chosen from the group consisting of $C_8$ to $C_{24}$ fatty acids.

10. The method of claim 9 wherein the monohydric, dihydric or trihydric alcohols used in the preparation of the oil formed from at least one ester are chosen from the group consisting of $C_2$ to $C_{20}$ alkanols and alkenols.

11. The method of claim 10, wherein the monohydric alcohol is chosen from the group consisting of ethanol, propanol, butanol, pentanol, stearic alcohol and oleic alcohol; the dihydric alcohol is chosen from the group consisting of propanediol, butanediol, pentanediol, hexanediol, heptanediol, octanediol, nonanediol, decanediol, undecanediol and dodecanediol and other dihydroxyalkanes or alkenes; and the trihydric alcohol is chosen from the group consisting of glycerol, butanetriol, pentanetriol, hexanetriol, heptanetriol, octanetriol, nonanetriol, decanetriol, undecanetriol and dodecanetriol and other trihydroxyalkanes or alkenes.

12. The method of claim 1, wherein the emulsion comprises. (i) at least one paraffin wax in an amount of 2% to 90% by weight, (ii) at least one hydrocarbon oil in an amount of 5% to 90% by weight, and (iii) at least one oil composed of at least one ester in an amount of 5% to 90% by weight, and water: a sufficient quantity to 100% by weight.

13. The method of claim 12, wherein the ratio of the at least one hydrocarbon oil, the at least one oil composed of at least one ester and of the paraffin wax that are present is at least 0.25.

14. The method of claim 13, wherein the composition, in emulsion form, has a dry matter content of between 10% by weight and 60% by weight.

* * * * *